(12) United States Patent
Hayes

(10) Patent No.: US 10,959,071 B1
(45) Date of Patent: Mar. 23, 2021

(54) ROADWAY RADIO FREQUENCY COMMUNICATION

(71) Applicant: Hayes Advanced Research and Development LLC, Pagosa Springs, CO (US)

(72) Inventor: Leo C Hayes, Pagosa Springs, CO (US)

(\*) Notice: Subject to any disclaimer, the term of this patent is extended or adjusted under 35 U.S.C. 154(b) by 0 days.

(21) Appl. No.: 17/116,208

(22) Filed: Dec. 9, 2020

Related U.S. Application Data

(60) Provisional application No. 62/987,426, filed on Mar. 10, 2020.

(51) Int. Cl.
*H04W 4/40* (2018.01)
*H04W 16/26* (2009.01)

(52) U.S. Cl.
CPC .......... *H04W 4/40* (2018.02); *H04W 16/26* (2013.01)

(58) Field of Classification Search
CPC .............................. H04W 4/40; H04W 16/26
USPC ............................................................ 455/7
See application file for complete search history.

(56) References Cited

U.S. PATENT DOCUMENTS

| | | | |
|---|---|---|---|
| 6,635,192 | B1 | 10/2003 | Schwarz |
| 8,763,695 | B2 | 7/2014 | Zanten |
| 2010/0171679 | A1* | 7/2010 | Ohshima ............... H01Q 5/364 343/893 |
| 2011/0140975 | A1* | 6/2011 | Shigetomi ............ H01Q 1/3291 343/713 |
| 2013/0341028 | A1 | 12/2013 | Christian et al. |
| 2015/0368539 | A1 | 12/2015 | Tour et al. |
| 2017/0290092 | A1* | 10/2017 | Berry ..................... G01S 13/92 |
| 2020/0217191 | A1 | 7/2020 | Hayes et al. |

FOREIGN PATENT DOCUMENTS

EP 2928817 A4 9/2016

OTHER PUBLICATIONS

Garcia, Alvaro, et al.; Electrical Conductivity of Asphalt Mortar Containing Conductive Fibers and Fillers; Construction and Building Materials; Jul. 23, 2009; 3175-3181.

\* cited by examiner

*Primary Examiner* — Ayodeji O Ayotunde
(74) *Attorney, Agent, or Firm* — MP Patents, LLC

(57) ABSTRACT

A system for roadway two-way radio frequency communication includes at least one radio transceiver, a carrier medium and at least one repeater. The carrier medium has a length and includes a plurality of carbon fibers embedded in a matrix. The carrier medium is configured to propagate electromagnetic signals produced by the transceiver along the length and to emit radio frequency signals in a direction transverse to the length over a short range. The at least one repeater is communicatively coupled with the carrier medium and configured to repeat, along the carrier medium, signals produced by the transceiver. A method for producing a system for roadway two-way radio frequency communication includes forming a carrier medium by providing a conductive additive to a matrix, applying the carrier medium to a roadway surface and coupling a radio transceiver to the carrier medium.

20 Claims, 9 Drawing Sheets

ROADWAY RADIO FREQUENCY COMMUNICATION

CROSS REFERENCE TO RELATED APPLICATIONS

This application claims the priority benefit of U.S. Provisional Application No. U.S. 62/987,426 filed on Mar. 10, 2020, which is incorporated herein by reference in its entirety.

TECHNICAL FIELD

The disclosure relates to electrically conductive materials for wireless communications.

SUMMARY

The disclosure describes system for roadway two-way radio frequency communication includes at least one radio transceiver, a carrier medium and at least one repeater. The carrier medium has a length and includes a plurality of carbon fibers embedded in a matrix. The carrier medium is configured to propagate electromagnetic signals produced by the transceiver along the length and to emit radio frequency signals in a direction transverse to the length over a short range. The at least one repeater is communicatively coupled with the carrier medium and configured to repeat, along the carrier medium, signals produced by the transceiver.

The disclosure further describes a carrier medium for two-way roadway radio frequency communication. The carrier medium includes a matrix and a plurality of carbon fibers embedded in the matrix. The matrix is configured for application to a surface substantially as a liquid and for subsequent drying and adhering to the surface so as to have a length. The plurality of carbon fibers are configured to propagate electromagnetic signals produced by a radio transceiver along the length over a long range and to emit RF signals in a direction transverse to the length over a short range.

Still further, the disclosure describes a method for producing a system for roadway two-way radio frequency communication. The method includes forming a carrier medium by providing a conductive additive to a matrix, applying the carrier medium to a roadway surface as a liquid, drying the carrier medium such that it adheres to the roadway surface with a width along a length, insulating a portion of the width of the carrier medium to restrict emission of radio frequency signals from an upper surface thereof defined by the width and length and coupling a radio transceiver to the carrier medium.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
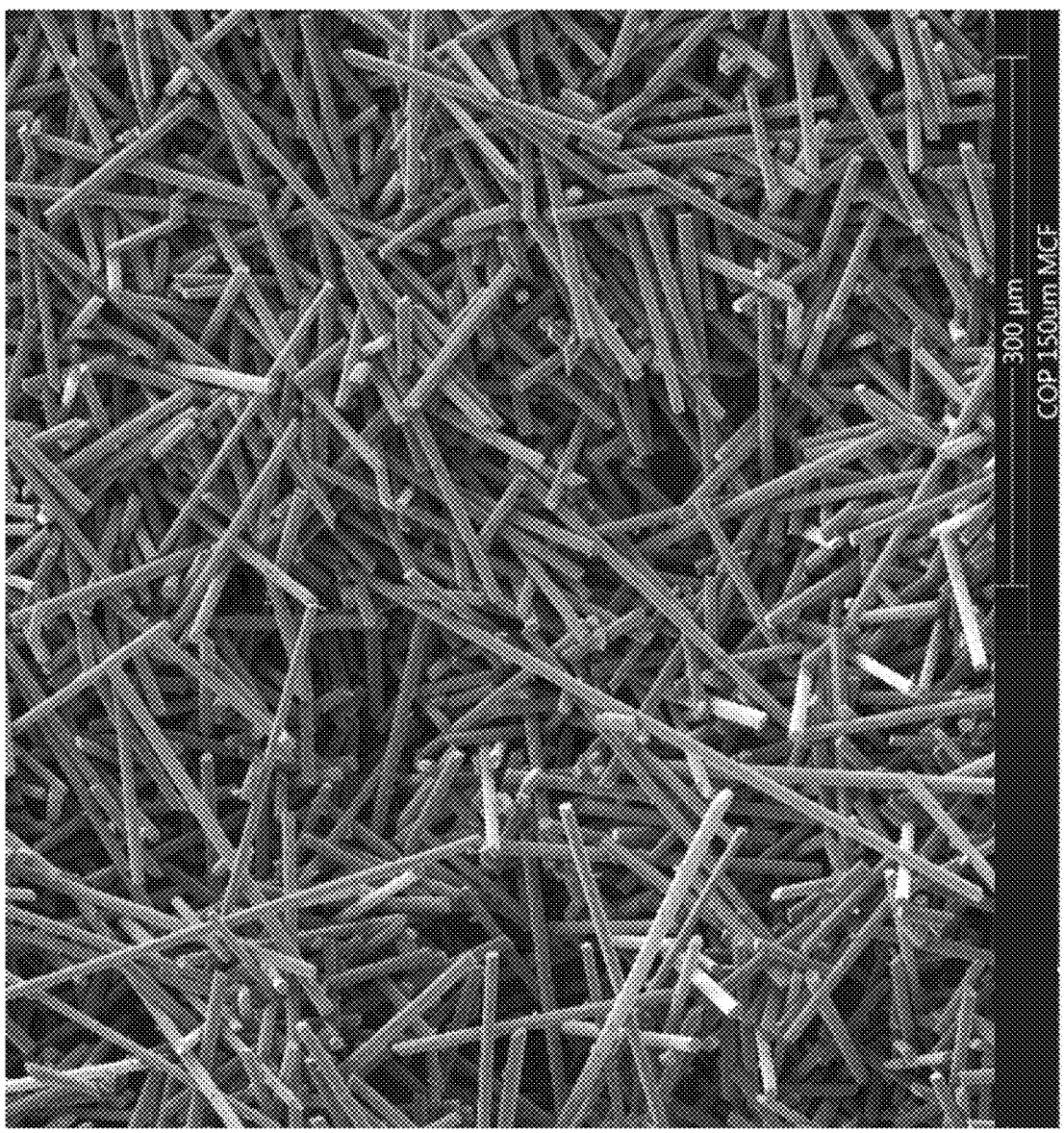
FIG. 1 is an electron microscope image of a first carbon fiber type.
Figure 2:
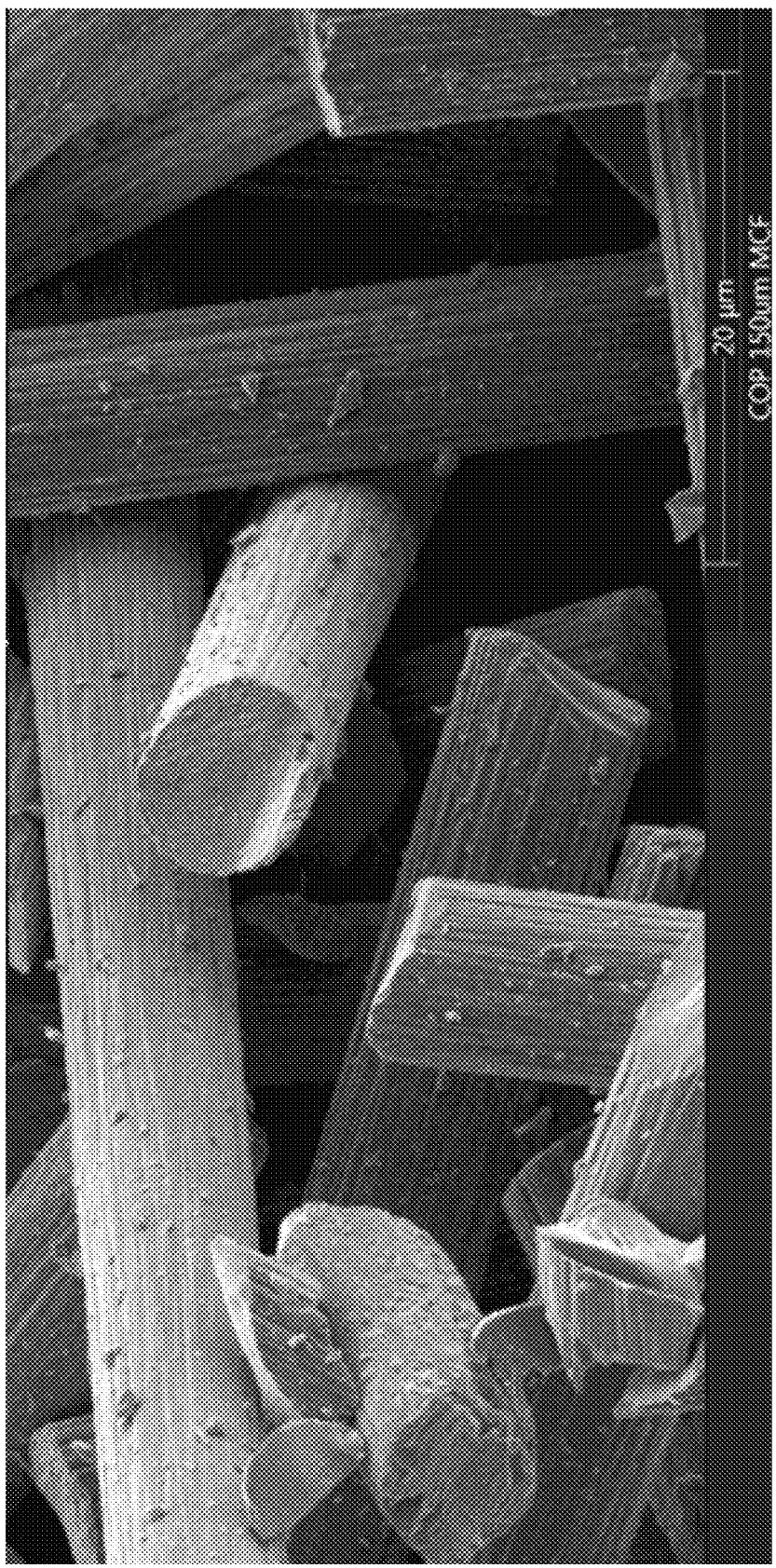
FIG. 2 is an electron microscope image of a second carbon fiber type.

The following detailed description illustrates embodiments of the disclosure and manners by which they can be implemented. Although the best mode of carrying out disclosed materials, systems, methods and program products has been described, those of ordinary skill in the art would recognize that other embodiments for carrying out or practicing disclosed materials, systems, methods and program products are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

The autonomous driving vehicle is rapidly moving into various levels of consumer use. The autonomous vehicle systems currently under development are set at five distinct levels of autonomy with higher functions added to each level: level one includes simple autonomy such as adaptive cruise control, lane departure notice, cameras, sensors; level two includes lane departure warning, lane centering control, perimeter awareness and braking control; level three includes some level of autonomous driving with hands-free operation requiring driver to remain seated behind the steering wheel, capable of driving point to point; level four enables driving from location A to location B with map address inputs with no driver inputs, still requiring driver attention when needed; and level five autonomy requires no driver, no steering wheel and is fully integrated with city traffic, although level five has not yet been achieved.

Embodiments of the disclosure substantially eliminate, or at least partially address, problems in the prior art, enabling higher levels of safety for autonomous vehicles.

Disclosed methods and systems enable an additional layer of safety by providing a communications link between road surfaces and level three and level four autonomous vehicles that previously could not be achieved. A greater level of safety will also be assured for future level five vehicles in that this vehicle autonomy would know all road parameters, road surface conditions, road construction, etc.

By adding disclosed conductive materials to a liquid medium or a medium that may become solid such as highway surface paint, an electromagnetic signal is transmitted directly through an anisotropic carrier medium for transmission and reception of large broadband wave groups without creating a standing wave. As such, a link may be established with vehicles equipped with a transceiver tuned at the operating frequency.

In rural locations where there is limited RF access or RF repeater systems for first responders, disclosed methods and systems will allow for an interface for first responders with the carrier medium in the highway stripping paint linking them to dispatch and/or other first responders through a network of transceivers and/or repeaters.

The autonomous vehicle industry is currently dependent upon vehicle onboard electronics and sensors for all situational awareness while driving/traveling on any public or non-public paved road surface. Disclosed methods and systems allow for an artificially intelligent node to manage local automobile traffic, traffic lights, pedestrian movement and notifications. Notifications may pertain to road conditions, road repairs or diversions. Surface road congestion, accidents and highway/freeway congestion may be reduced by utilizing the RF signal in the highway striped paint for platooning, assuring smooth continuous traffic flow on roadways while providing open pathways for first responders. Specific and unique sensors may be located at strategic points to capture traffic conditions, weather conditions and road surface conditions such as frozen surface or wet surface.

A conductive anisotropic material suspended in a liquid material allows for electromagnetic wave energy in the form of radio frequency RF to be transmitted through the conductive material as loaded in the liquid material. The RF will be transmitted through the conductive material much like RF normally transmitted on a single standing antenna or di-pole antenna in the atmosphere. The transmission could be of any type of data, commands, audio, video and/or situational information much the same as any wireless atmospheric transmissions are done today. With the disclosed carrier media, due to the anisotropic nature of the conductive material, the RF or electromagnetic wave energy is retained within the loaded matrix while allowing sufficient RF leakage for wireless links with any autonomous vehicle equipped with an appropriate transceiver.

Additional aspects, advantages, features and objects of the disclosure will be made apparent from the drawings and the detailed description of the illustrative embodiments construed in conjunction with the appended claims that follow. It will be appreciated that described features are susceptible to being combined in various combinations without departing from the scope of the disclosure as defined by the appended claims.

A two-way carrier medium for roadway radio frequency communication includes a matrix configured for application to a surface substantially as a liquid and for subsequent drying and adhering to the surface so as to have a length. A plurality of carbon fibers are embedded in the matrix and configured to propagate electromagnetic signals produced by a radio transceiver along the length over a long range and to emit RF signals in a direction transverse to the length over a short range.

For example, the carbon fibers may be configured to propagate electromagnetic signals produced by a radio transceiver in a range of from about 100 m to about 1000 m while emitting RF signals transverse to the length of the carrier medium within a range of from about 1.0 to about 3.0 m.

The plurality of carbon fibers exhibit an anisotropic arrangement within the matrix. In a further example, when material characteristics differing in mutually orthogonal directions are desirable, carbon fibers may be provided in an orthotropic arrangement.

FIG. 1 is an electron microscope image of a volume of a first carbon fiber type showing the rod structure of milled first length of carbon fiber additive. Sizes range between 6 and 8 microns in diameter with typical lengths ranging between 100 and 300 microns contributing directly to the retention of RF signals within the carbon fibers.

FIG. 2 is an electron microscope image of a volume of a second type of carbon fiber showing the rod structure of a highly milled second length of carbon fiber additive. Sizes range between 6 and 8 microns in diameter and 10 to 30 microns in length.

Each carbon fiber within the matrix retains the RF signal integrity and perpetuates the RF signal through the carbon fibers. The longer carbon fiber material propagates the primary electromagnetic EM wave while the shorter carbon fiber groups carries and contains the EM wave to maintain its energy levels as it propagates from one longer to another longer fiber thereby maintaining signal strength, signal integrity and signal form of the EM wave.

The carbon fibers may be high-density carbon fiber material with a cross section of approximately 7.5 microns while the first length is from about 2 to about 3 times longer than the second length. In a further example, the first length is about 2.5 times longer than the second length.

A suitable ratio of fibers of the first length to fibers of the second length may depend on environmental factors. In an example, the ratio of carbon fibers exhibiting the first length to carbon fibers exhibiting the second length is from about 3:7 to about 1:1. In a further example, the ratio of carbon fibers exhibiting the first length to carbon fibers exhibiting the second length is about 2:3.

The carbon fiber loading levels by weight can be as small as 0.005% for certain applications with a standard loading level between 0.08% for base level conductivity up to 25% and greater for specific applications allowing for a dramatically reduced level of resistivity.

In an example, the carbon fibers make up from about 0.8 to about 1.8% of the carrier medium by weight. With this loading level, disclosed anisotropic materials are not expected to be sufficiently conductive to allow free flow of electrons/ions. Therefore, radio frequency transmissions, as electromagnetic energy waves, may be generated through a computer processor or analogue processor in various wave forms including but not limited to analog signals, frequency modulation, amplitude modulation, phase modulation, pulse width modulation, digital RF, high-definition RF, software defined radio or a combination of these. These signals may be boosted by one or more repeaters located, as part of a networked system, at various points on the side of or within the highway structure through the matrix host material which becomes capable of transmitting and receiving content including, but not limited, commands, voice, video, energy and data. Data may further include but is not limited to vehicle road use for taxation, unique and specific vehicle data/history by county or state and federal highway use either commercial or private.

The carrier medium may be configured to emit radio frequency signals in a direction transverse to the length within a range of from about 1.0 to about 3.0 m. The frequency bandwidth range, from 10 Hz to 10 GHz, is extremely broad. Each unique bandwidth requires adjustment to the conductive loading levels and anisotropic material aspect ratios. In certain cases, it will allow Terahertz and Picohertz range signals to be transmitted long distances and at very low energy level.

In another example, for a low frequency MHz range such as 100 MHz to 200 MHz, 0.120 mm length milled carbon fibers combined with 3.0 mm length carbon fibers provided optimal internal retention of RF signal propagation, signal integrity and signal carrier for distance with controlled RF leakage. Further this example retains the electromagnetic energy in conductive materials anisotropic aspect ratios within the loaded mass base, with very little amount of EM energy radiated outwardly as in a normal wireless antenna.

Figure 3:
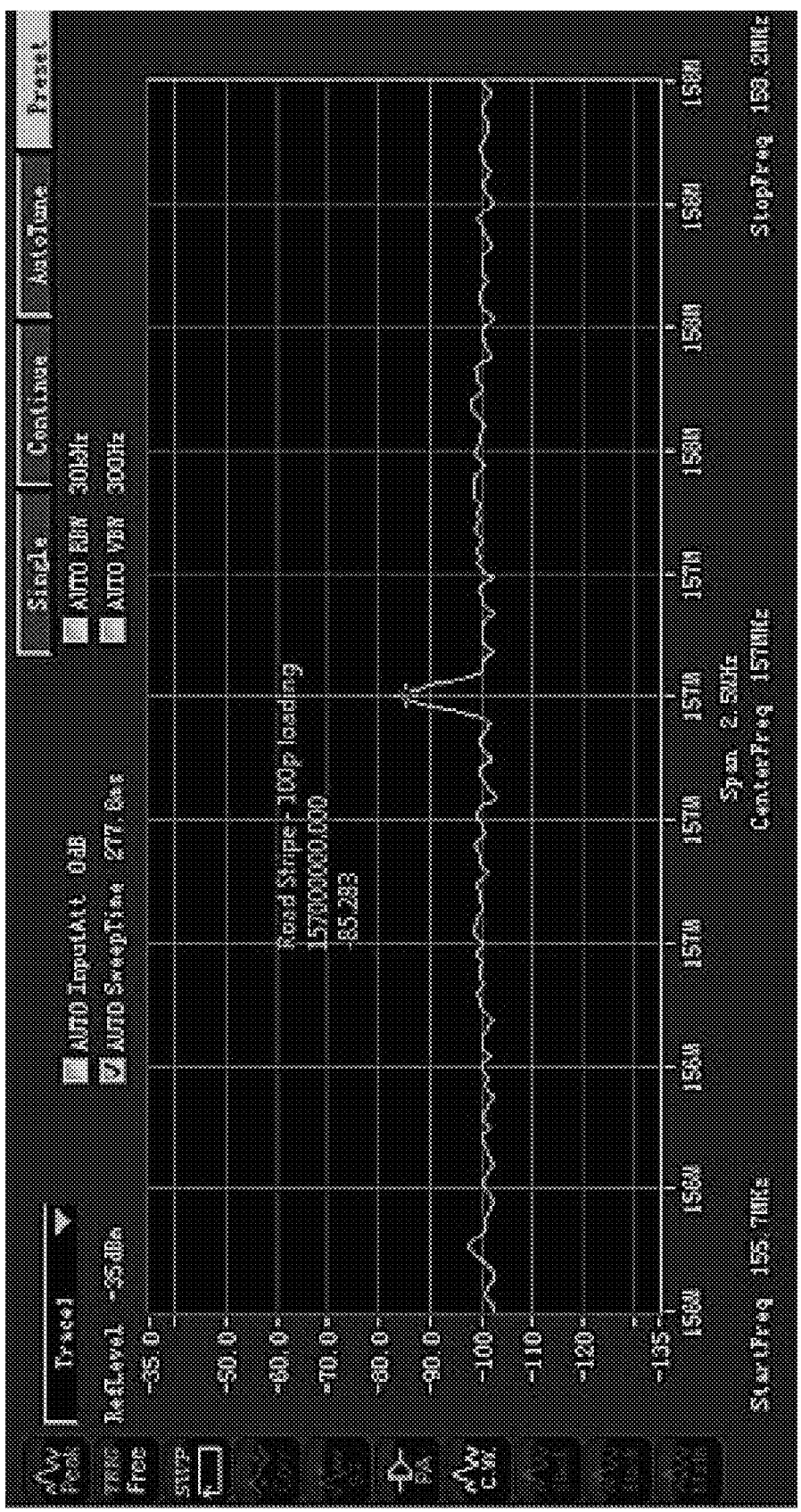
FIG. 3 illustrates a spectrum analyzer plot of an example electromagnetic signal propagated by disclosed carrier media.

FIG. 3 illustrates a spectrum analyzer plot of an example electromagnetic signal propagated by disclosed carrier media. A strong and well-defined signal may be observed at 156.8 mH within the carrier medium with RF SG at −60 dBm.

Figure 4:
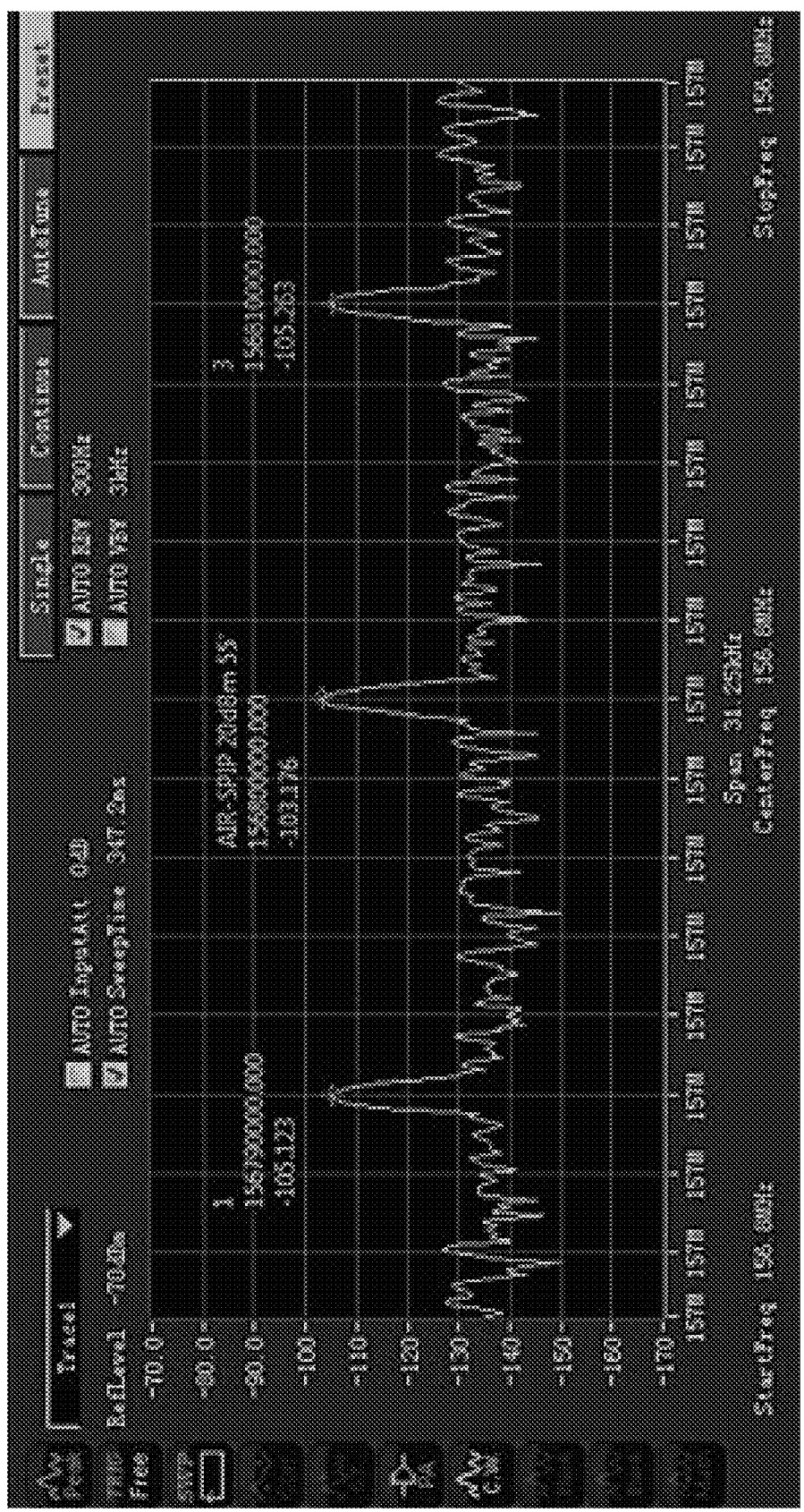
FIG. 4 illustrates a spectrum analyzer plot of multiple example electromagnetic signals propagated by disclosed carrier media.

FIG. 4 illustrates a spectrum analyzer plot of another example electromagnetic signal propagated by disclosed carrier media. Three distinct and separate, well-defined RF signals may be observed at 156.81, 156.80 and 156.79 mH within the carbon fibers with RF SG at −60 dBm. The ability for the carbon fibers to carry these distinct signals clearly indicates the integrity of the carbon fibers to maintain this RF signal diversity. This clearly demonstrates the capability of the carbon fibers to carry an extreme number of signal ranges while maintaining the signal integrity of each frequency.

Figure 5:
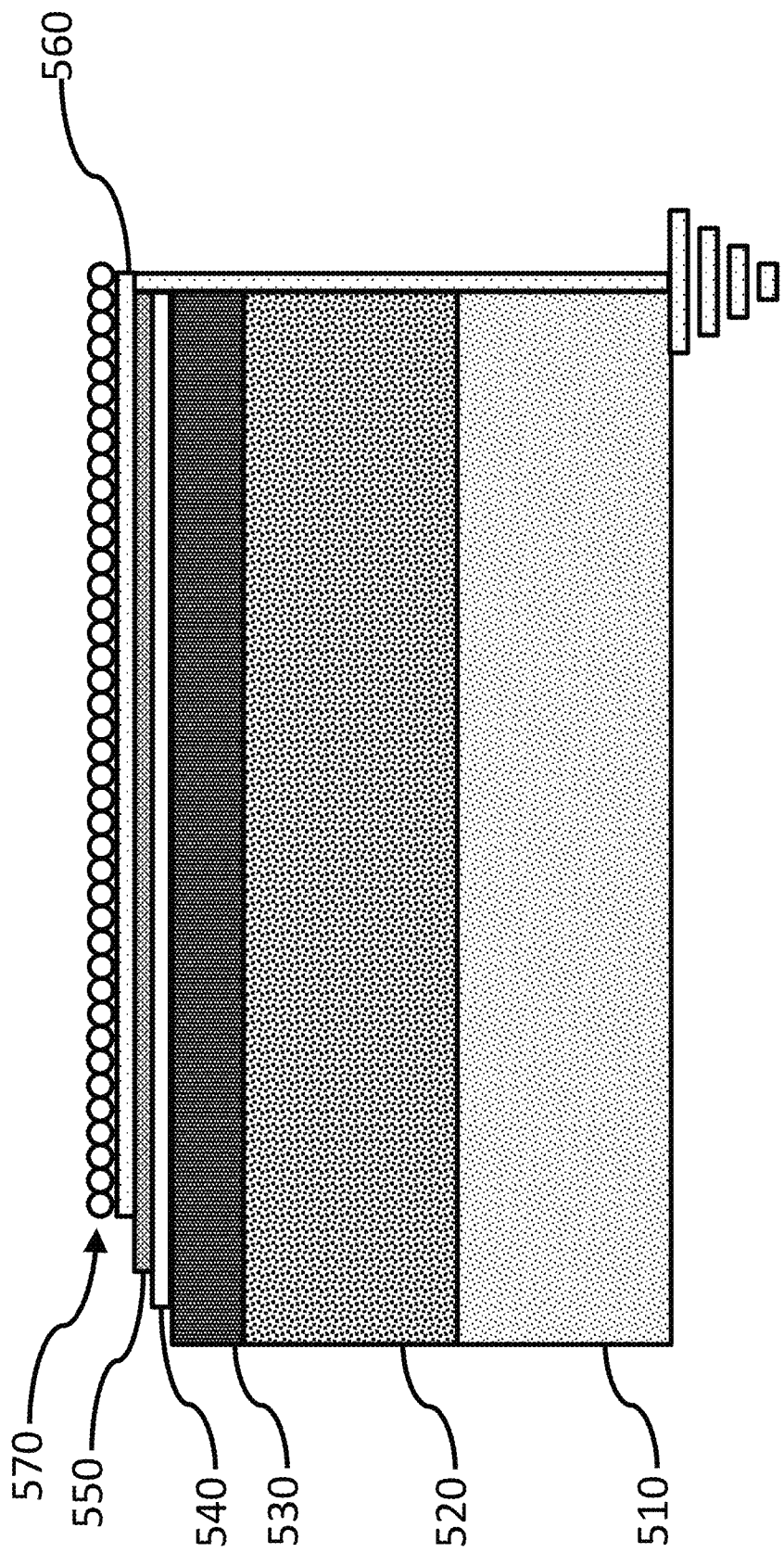
FIG. 5 schematically illustrates a cross-section of an example carrier medium applied to a highway surface.

FIG. 5 schematically illustrates a cross-section of an example carrier medium applied to a roadway surface. The roadway may include a layer of sub-base and compacted subgrade 510, a road base layer 520 over the sub-base and compacted subgrade 510 and a roadway surface 530 such as asphalt or cement.

Carrier medium 550 includes a matrix configured for application to a surface substantially as a liquid and for subsequent drying and adhering to the surface so as to have a length and a plurality of carbon fibers embedded in the matrix and configured to transmit electromagnetic signals produced by a radio transceiver along the length. Carrier medium 550 may be configured to coat the surface to a thickness from about 0.5 to about 3.0 mm.

A dielectric material layer 540 may be applied on the roadway surface 530 prior to applying carrier medium 550. In an example, the dielectric material layer is an epoxy paint. A grounded conductive layer 560 may be applied to an exposed surface of carrier medium 550 such that carrier medium 550 is sandwiched between dielectric material layer 540 and conductive layer 560. Conductive layer 560 may an epoxy paint loaded with non-linear conductive carbon-based material such as graphite.

A non-metallic bead barrier 570 may be applied to a surface of the matrix so as to enhance durability of carrier medium 550 when provided to, for example, a roadway. In an example, non-metallic bead barrier 570 may cover from about 30% to about 66% of the width of carrier medium 550. Non-metallic bead barrier 570 may include, but is not limited to, glass beads. In some cases, materials used for barrier 570 may also restrict emission of the radio frequency signals, for example, in a direction transverse to the length.

Figure 6:
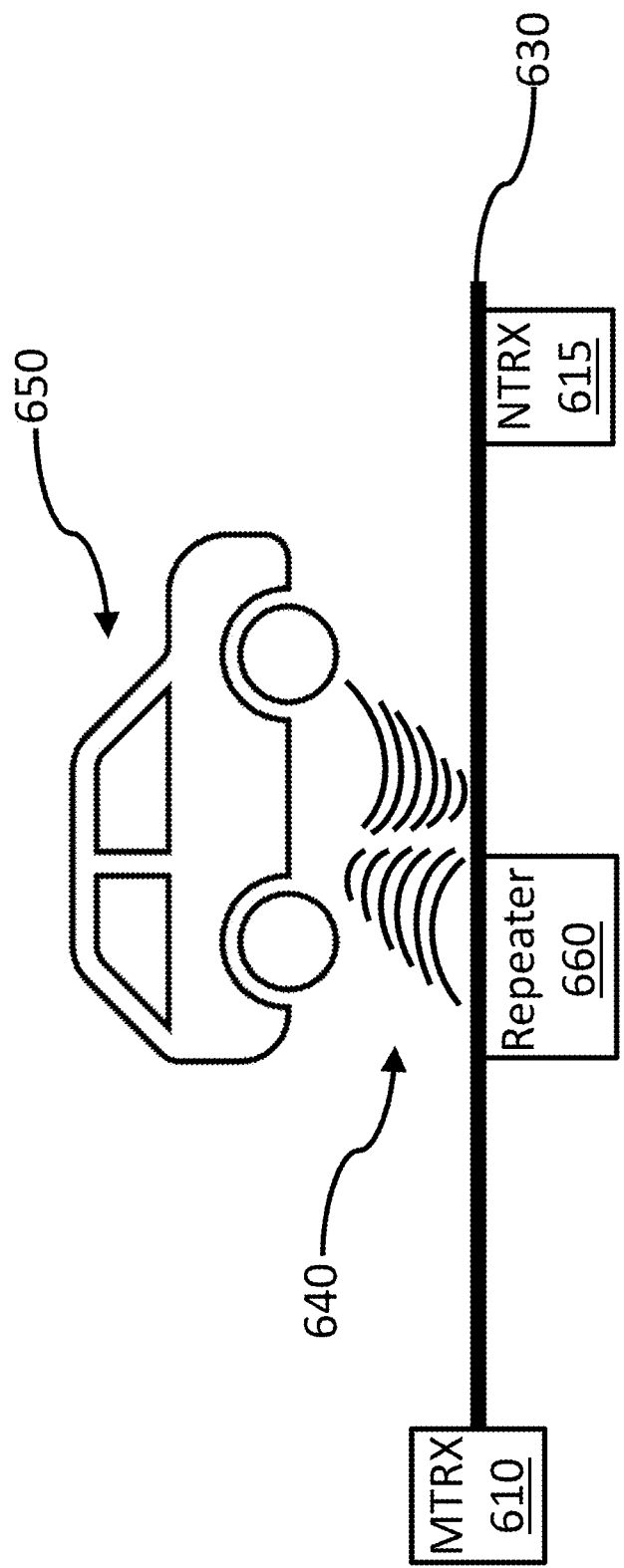
FIG. 6 schematically illustrates a side view of an example system for roadway radio frequency communication.
Figure 7:
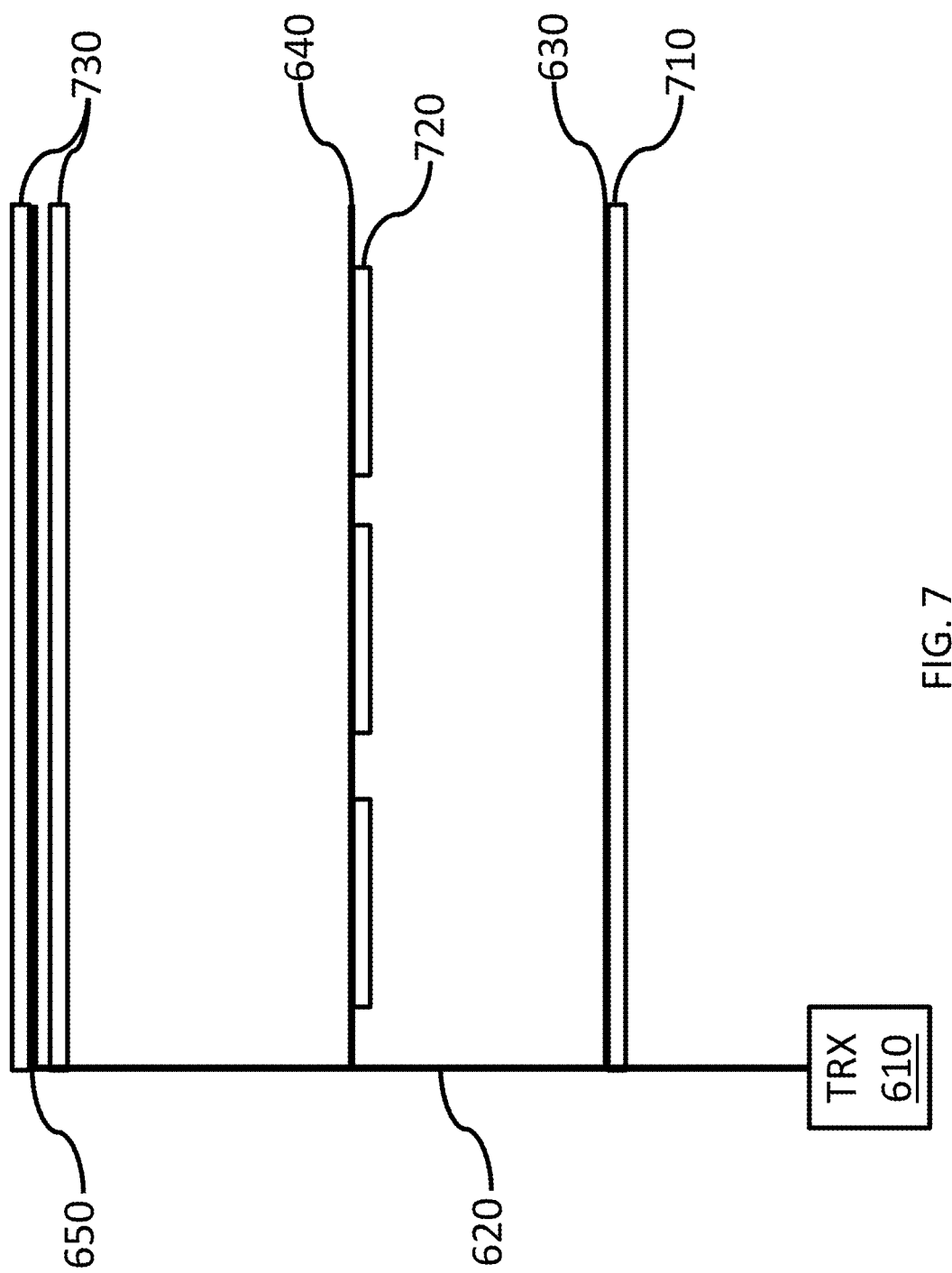
FIG. 7 schematically illustrates a top view of the example system of FIG. 6.

FIG. 6 schematically illustrates a side view and FIG. 7 schematically illustrates a top view of a system for roadway two-way radio frequency communication. The system includes at least one radio transceiver 610, a carrier medium 630 applied to a roadway surface and at least one repeater 660. The carrier medium has a length and includes a plurality of carbon fibers embedded in a matrix. The carrier medium is configured to propagate electromagnetic signals produced by the transceiver along the length and to emit radio frequency signals 640 in a direction transverse to the length over a short range. As vehicle 650 moves along the roadway, it transmits and receives two-way RF data to/from one or more transceivers 610 through medium 630. The at least one repeater 660 is communicatively coupled with carrier medium 630 and configured to repeat, along the carrier medium, signals produced by transceiver 610.

Referring to FIG. 7, a first branch, strand or strip 630 of the carrier medium parallels or underlies white paint stripe 710 designating the boundary between the drivable road surface and the road shoulder. A second strip 640 of the carrier medium parallels or underlies dashed white stripe 720 designating the boundary between first and second lanes of the roadway. A third strip 650 of the carrier medium parallels or underlies double yellow stripe 730 designating the boundary between inbound and outbound traffic lanes.

First 630, second 640 and third 650 strips of the carrier medium are operatively and/or communicatively coupled through RF continuity connection or transverse strip 620. By way of example, each of strips 620, 630, 640 and 650 may be from about 3 inches to about 6 inches wide.

The system may further be considered a networked system for roadway radio frequency communication. A master transmitter links wirelessly and hardline through carrier medium 630 to a plurality of meshed transmitter nodes 615 within 10 to 30 km depending upon geographical limitations. The master transmitter transmits highway condition, traffic, etc. through the carrier medium to each transmitter node. The master transmitter transmits to a main system controller which performs like a dispatch system for highway conditions, specific warnings, traffic, weather conditions, etc. In another example, transmitter nodes may be spaced from about 100 to about 1000 meters.

A method for producing a system for roadway radio frequency 2-way communication between an appropriately equipped vehicle traveling within the proximity of the carrier medium includes forming a carrier medium by providing a conductive additive to a matrix, applying the carrier medium to a roadway surface as a liquid, drying the carrier medium such that it adheres to the roadway surface with a width along a length, insulating a portion of the width of the carrier medium to restrict emission of radio frequency signals from an upper surface thereof defined by the width and length and coupling a radio transceiver to the carrier medium.

Providing the conductive additive may further include providing a plurality of carbon fibers. The plurality of carbon fibers may be provided so as to exhibit a plurality of lengths. For example, at least first and second lengths of carbon fibers may be provided such that first length is from about 2 to about 3 times longer than the second length. In a further example, the carbon fibers may be provided so as to exhibit the first and second lengths such that first length is about 2.5 times longer than the second length. In an example, carbon fibers exhibiting the first length may be about 3.0 mm long while carbon fibers of the second length are about 0.12 mm long.

The plurality of carbon fibers may be provided such that a ratio of carbon fibers exhibiting the first length to carbon fibers exhibiting the second length is from about 3:7 to about 1:1. In an example, the ratio of carbon fibers exhibiting the first length to carbon fibers exhibiting the second length is about 2:3. In extreme heat or cold, ratios between the first and second lengths of carbon fibers may be changed by up to about 30%.

The plurality of carbon fibers may be provided so as to make up from about 0.005 to about 25% of the carrier medium by weight. In a further example, the carbon fibers are provided so as to make up from about 0.8 to about 1.8% of the carrier medium by weight. In extreme heat or cold, the levels of carbon fibers in the carrier medium may be increased by from about 10% to about 30%.

Providing the conductive additive to the matrix may be performed by providing the conductive additive to a paint. The conductive additive may be provided to a paint including but not limited to a water-based paint, an epoxy-based paint or a combination of these which may be applied to the roadway surface to a thickness of from about 0.5 to about 3.0 mm.

A dielectric material layer may be applied to the roadway surface prior to applying the carrier medium. A conductive layer may be applied to an exposed surface of the carrier medium. A portion of the width of the carrier medium may be insulated with a plurality of glass beads as part of a configuration for suitable emission range. For example, the glass beads may be applied to the conductive layer.

The method may further include communicatively coupling at least one repeater with the carrier medium remote from the transceiver such that the repeater, repeats signals produced by the transceiver along the carrier medium.

The actions described for use in the method for producing a system for roadway radio frequency communication are only illustrative and other alternatives can also be provided where one or more actions are added, one or more actions are removed, or one or more actions are provided in a different sequence without departing from the scope of the claims herein.

Figure 8:
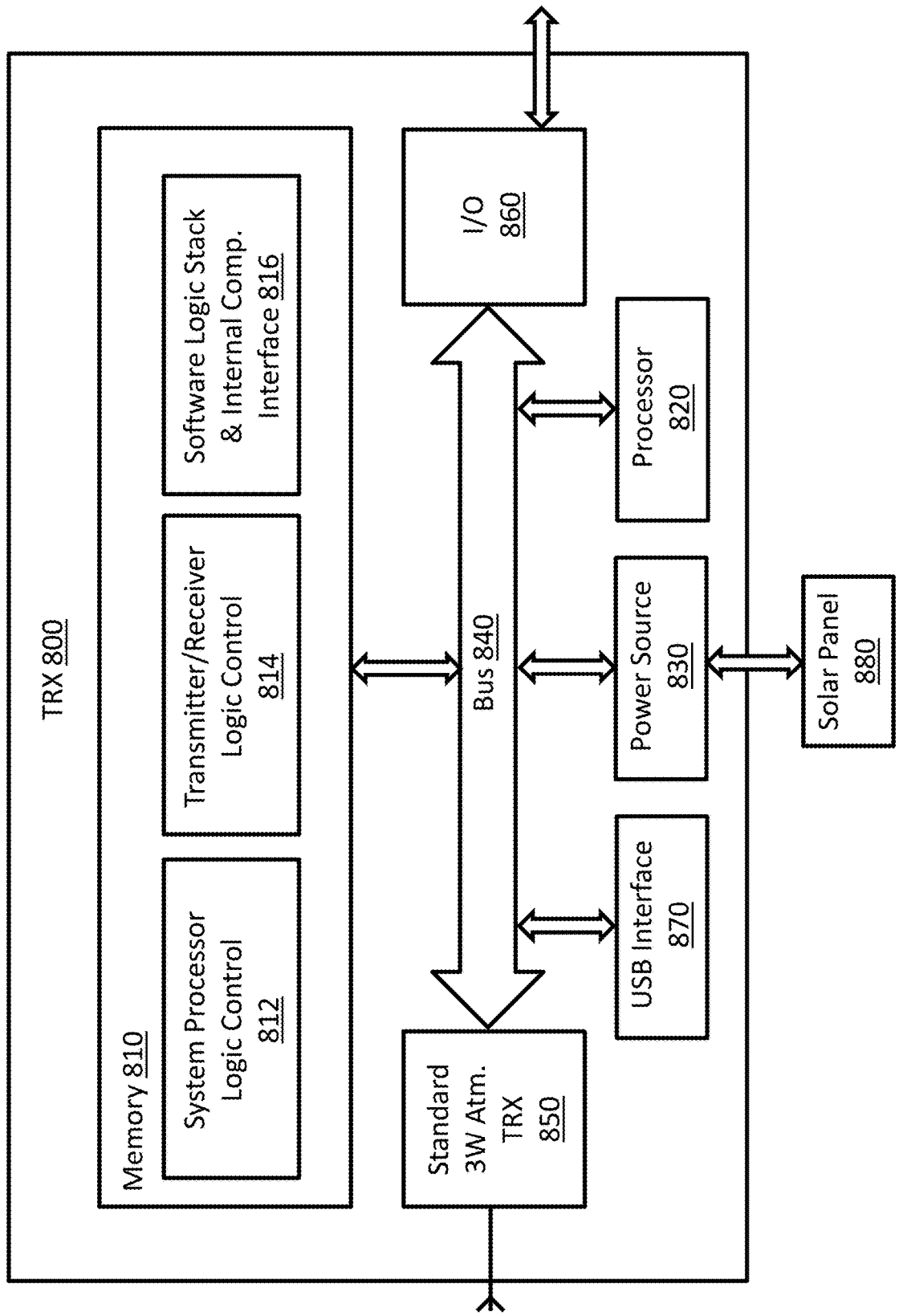
FIG. 8 schematically illustrates an example radio transceiver usable as part of disclosed smart highway systems.

FIG. 8 schematically illustrates an example radio transceiver 800 usable as part of disclosed smart highway systems. Transceiver 800, in accordance with an embodiment of the disclosure includes, but is not limited to, a memory 810, computing hardware such as a processor 820, Input/Output (I/O) 860, a standard 3 W atmosphere TRX 850 for generating a carrier signal, and a system bus 840 that operatively couples various components including memory 810, processor 820, I/O 860 and standard 3 W atmosphere TRX 850.

Radio transceiver 800 may further include a USB interface 870. Radio transceiver 800 may further include a processor 820 such as a microprocessor. In an example, processor 820 and USB interface 870 may be part of a system-on-a-chip.

Transceiver 800 also includes a power source 830 for supplying electrical power to the various components of transceiver 800. Power source 830 may, for example, include a rechargeable battery chargeable by, for example, solar panel 880.

Memory 810 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Memory 810 stores a system processor logic control 812, transmitter/receiver logic control 814 and a logic stack and internal component interface 816. System processor logic control 812, transmitter/receiver logic control 814, as well as logic stack and internal component interface 816 may include software products having computer-readable instructions causing transceiver 800 to perform various tasks.

I/O 860 outputs RF TRX into the carrier medium and receives RF signals from the carrier medium.

Figure 9:
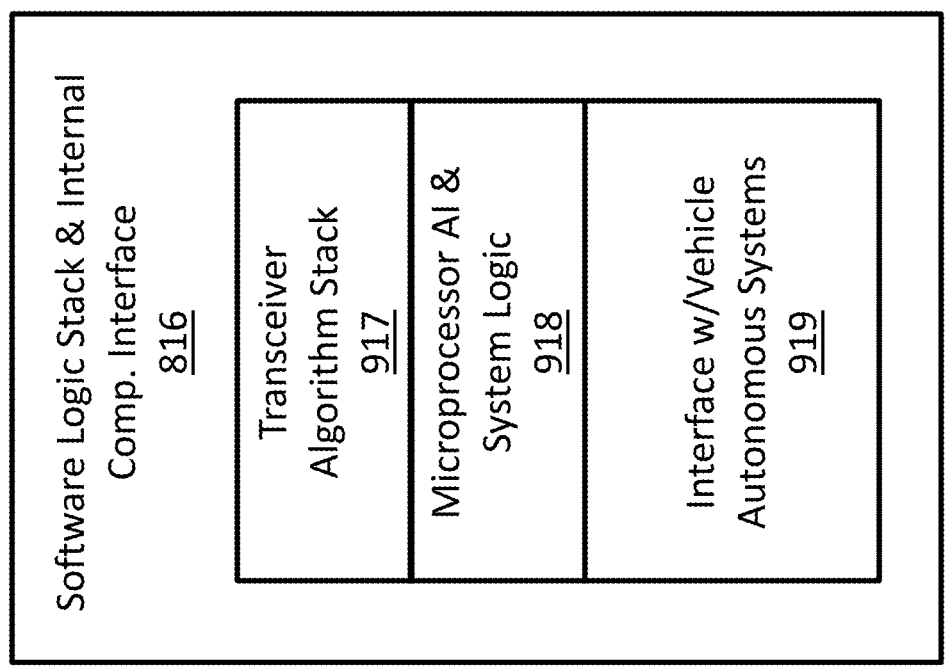
FIG. 9 is a block diagram of an example software stack suitable for configuring disclosed radio transceivers.

FIG. 9 is a block diagram of an example software stack suitable for configuring disclosed radio transceivers. Logic stack & internal component interface 816 further includes a transceiver algorithm stack 917, microprocessor AI & system logic 918 and vehicle autonomous systems interface 919. Transceiver algorithm stack 917 causes processor 820 to receive and interpret various RF forms as well as send RF signals coding road and/or traffic conditions. Microprocessor AI & system logic 918 causes processor 820 to perform analysis of various incoming RF forms and/or noise. The results of the analysis may provide information about road and/or traffic conditions which may be transmitted to a vehicle travelling on disclosed smart highway systems.

A method for roadway radio frequency communication includes applying a carrier medium to a roadway surface so as to have a width along a length, insulating a portion of the width of the carrier medium to restrict emission of radio frequency signals from an upper surface thereof defined by the width and length and coupling a radio transceiver to the carrier medium.

The carrier medium applied may be formed by providing a conductive additive to a matrix. The carrier medium may be applied as a paint and the insulated portion covered with a plurality of glass beads.

An electromagnetic signal may then be transmitted from the transceiver through the carrier medium and radio-frequency signals may be emitted from the carrier medium in a direction transverse to the length. The EM wave is contained within the suspended conductive material with controlled leakage allowed through the side of the paint material. Radio-frequency signals may be emitted from the carrier medium in a direction transverse to the length within a range of from about 1.0 to about 3.0 m.

The radio-frequency signals may be received from the carrier medium with one or more transceivers which may be stationary, moving or a combination of these. For example, the radio-frequency signals are received by one or more vehicles travelling within range of the carrier medium. The EM or RF wave leakage enables a link between the disclosed communication system and onboard transceivers and computer systems of an appropriately equipped vehicle. In an example, the vehicle is an autonomous vehicle. The contained signal modes provide all aspects of RF-type carrier normally propagated in the atmosphere.

Disclosed systems further allow for a vehicle equipped with a transceiver system matching the roadway matrix frequency to transmit data to the roadway matrix while the roadway matrix is (wirelessly communicating) with that vehicle.

Disturbances in the radio-frequency signals emitted from the carrier medium may be measured, for example, in accordance with microprocessor AI & system logic 918 and notifications may be sent to two or more networked transceivers in response to the measured disturbances.

If the carrier medium degrades, the insulation may be removed from the carrier medium, the carrier medium may be reapplied to the roadway surface and the portion of the width of the carrier medium may be reinsulated. In systems incorporating a dielectric material layer and/or conductive layer, those layers may need to be removed and reapplied as well.

The actions described for use in the disclosed method for roadway radio frequency communication are only illustrative and other alternatives can also be provided where one or more actions are added, one or more actions are removed, or one or more actions are provided in a different sequence without departing from the scope of the claims herein.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A system for roadway two-way radio frequency communication, comprising:
   at least one radio transceiver;
   a carrier medium having a length and including a plurality of carbon fibers embedded in a matrix, the carrier medium configured to propagate electromagnetic signals produced by the transceiver along the length and to emit radio frequency signals in a direction transverse to the length over a short range; and
   at least one repeater communicatively coupled with the carrier medium and configured to repeat, along the carrier medium, signals produced by the transceiver.

2. The system as set forth in claim 1, further comprising a glass bead barrier insulating a surface of the carrier medium so as to restrict emission of the radio frequency signals.

3. The system as set forth in claim 1, wherein the plurality of carbon fibers further comprise a plurality of carbon fibers exhibiting at least first and second lengths.

4. The system as set forth in claim 1, wherein the carrier medium is configured for application to a surface substantially as a liquid and for subsequent drying and adhering to the surface.

5. The system as set forth in claim 1, further comprising a dielectric material layer in contact with the carrier medium.

6. The system as set forth in claim 5, wherein the carrier medium is sandwiched between the dielectric material and a conductive layer.

7. A carrier medium for two-way roadway radio frequency communication, comprising:
   a matrix configured for application to a surface substantially as a liquid and for subsequent drying and adhering to the surface so as to have a length; and
   a plurality of carbon fibers embedded in the matrix and configured to propagate electromagnetic signals produced by a radio transceiver along the length over a long range and to emit RF signals in a direction transverse to the length over a short range.

8. The carrier medium as set forth in claim 7, wherein the plurality of carbon fibers further comprise a plurality of carbon fibers exhibiting at least first and second lengths.

9. The carrier medium as set forth in claim 8, wherein the ratio of carbon fibers exhibiting the first length to carbon fibers exhibiting the second length is between about 3:7 and about 1:1.

10. The carrier medium as set forth in claim 7, wherein the plurality of carbon fibers exhibit an anisotropic arrangement within the matrix.

11. The carrier medium as set forth in claim 7, wherein the carbon fibers are configured to emit radio frequency signals in a range of from about 1.0 to about 3.0 m.

12. The carrier medium as set forth in claim 7, wherein the carbon fibers are configured to propagate electromagnetic signals produced by a radio transceiver in a range of from about 150 to about 215 m.

13. The carrier medium as set forth in claim 7, wherein the matrix further comprises a paint.

14. A method for producing a system for roadway two-way radio frequency communication, comprising:
   forming a carrier medium by providing a conductive additive to a matrix;
   applying the carrier medium to a roadway surface as a liquid;
   drying the carrier medium such that it adheres to the roadway surface with a width along a length;
   insulating a portion of the width of the carrier medium to restrict emission of radio frequency signals from an upper surface thereof defined by the width and length; and
   coupling a radio transceiver to the carrier medium.

15. The method as set forth in claim 14, wherein providing the conductive additive to the matrix further comprises providing the conductive additive to a paint.

16. The method as set forth in claim 14, wherein insulating further comprises insulating with a plurality of glass beads.

17. The method as set forth in claim 14, wherein providing the conductive additive further comprises providing a plurality of carbon fibers.

18. The method as set forth in claim 14, wherein providing the plurality of carbon fibers further comprises providing a plurality of carbon fibers exhibiting at least first and second lengths.

19. The method as set forth in claim 14, further comprising applying a dielectric material layer to the roadway surface prior to applying the carrier medium.

20. The method as set forth in claim 14, further comprising applying a conductive layer to an exposed surface of the carrier medium.

* * * * *